(12) United States Patent
Frank et al.

(10) Patent No.: US 7,369,940 B2
(45) Date of Patent: May 6, 2008

(54) METHOD FOR OPERATING A DISPLAY SYSTEM IN A VEHICLE FOR DRIVING INTO A PARKING SPACE

(75) Inventors: Peter Frank, Aschaffenburg (DE);
Martin Laufer, Hasloch (DE);
Karl-Josef Marks, Collenberg (DE);
Werner Seitz, Collenberg (DE)

(73) Assignee: Magna Donnelly GmbH & Co. KG, Dorfprozelten (DE)

( * ) Notice: Subject to any disclaimer, the term of this patent is extended or adjusted under 35 U.S.C. 154(b) by 609 days.

(21) Appl. No.: 11/060,621

(22) Filed: Feb. 17, 2005

(65) Prior Publication Data

US 2005/0203704 A1 Sep. 15, 2005

(30) Foreign Application Priority Data

Mar. 12, 2004 (DE) .................. 10 2004 012 604

(51) Int. Cl.
*B60Q 1/48* (2006.01)
(52) U.S. Cl. .................................. 701/300; 340/932.2
(58) Field of Classification Search ............. 340/932.2
See application file for complete search history.

(56) References Cited

U.S. PATENT DOCUMENTS

| | | | |
|---|---|---|---|
| 6,326,887 B1 * | 12/2001 | Winner et al. ............... 340/435 |
| 6,344,805 B1 * | 2/2002 | Yasui et al. ............... 340/932.2 |
| 6,487,481 B2 * | 11/2002 | Tanaka et al. ................. 701/41 |
| 6,621,421 B2 * | 9/2003 | Kuriya et al. ............. 340/932.2 |
| 6,919,822 B2 * | 7/2005 | Tanaka et al. ........... 340/932.2 |
| 7,043,346 B2 * | 5/2006 | Kubota et al. ................. 701/28 |
| 7,053,794 B2 * | 5/2006 | Tanaka et al. ........... 340/932.2 |

(Continued)

FOREIGN PATENT DOCUMENTS

DE 197 41 896 C2 8/1999

(Continued)

*Primary Examiner*—Thomas Black
*Assistant Examiner*—Shelley Chen
(74) *Attorney, Agent, or Firm*—McGlew and Tuttle P.C.

(57) ABSTRACT

A method for operating a display system in a vehicle (03) when driving into a parking space (06), uses a camera (01) with an image processing unit in which the image data obtained by the camera (01) can be processed and a display screen (02) in the interior of the vehicle. After the vehicle has moved to the vehicle position in which the first parking-space icon (07) has been brought to overlay the parking space (06) shown in the real-time image, a second parking-space icon (09) is faded into the real-time image on the display screen (02) by the image processing unit, with this second parking-space icon (09) in the real-time image in true scale indicating a region which after moving along a first segment (15) of the travel path (14) towards the parking space (06) must be brought to overlay the parking space (06) shown in the real-time image. After the vehicle has moved to the vehicle position in which the second parking-space icon (09) has been brought to overlay the parking space (06) shown in the real-time image, a third parking-space icon (11) is faded into the real-time image on the display screen (02) by the image processing unit, with said third parking-space icon (11) in the real-time image in true scale indicating a region which after moving along a second segment (16) of the travel path towards the parking space (06) must be brought to overlay the parking space (06) shown in the real-time image.

22 Claims, 5 Drawing Sheets

U.S. PATENT DOCUMENTS

| | | |
|---|---|---|
| 7,069,128 B2* | 6/2006 | Iwama .................... 701/36 |
| 7,088,262 B2* | 8/2006 | Schindler et al. ........ 340/932.2 |
| 7,117,073 B2* | 10/2006 | Endo et al. .................. 701/28 |
| 2003/0030724 A1* | 2/2003 | Okamoto ................. 348/148 |
| 2003/0151526 A1* | 8/2003 | Tanaka et al. ........... 340/932.2 |
| 2003/0156045 A1* | 8/2003 | Tanaka et al. ........... 340/932.2 |
| 2004/0130464 A1* | 7/2004 | Schindler et al. ........ 340/932.2 |
| 2004/0257244 A1* | 12/2004 | Kubota et al. ........... 340/932.2 |

FOREIGN PATENT DOCUMENTS

| | | |
|---|---|---|
| DE | 100 15 897 A1 | 11/2000 |
| DE | 100 65 327 A1 | 8/2001 |
| DE | 100 45 616 A1 | 3/2002 |
| DE | 101 61 316 A1 | 7/2002 |
| DE | 102 50 021 A1 | 5/2004 |

* cited by examiner

METHOD FOR OPERATING A DISPLAY SYSTEM IN A VEHICLE FOR DRIVING INTO A PARKING SPACE

CROSS REFERENCE TO RELATED APPLICATIONS

This application claims the benefit of priority under 35 U.S.C. § 119 of DE 10 2004 012 604.6 filed Mar. 12, 2004, the entire contents of which are incorporated herein by reference.

FIELD OF THE INVENTION

The invention relates to a method for operating a display system in a vehicle when driving into a suitable parking space wherein at least one camera is acquires an observation region in the vicinity of the vehicle and an image processing processes image data and a display screen in the interior of the vehicle displays the image data wherein a first parking-space icon is faded into the real-time image on the display screen by the image processing unit in true scale indicating a region which the vehicle can reach from its actual starting position after moving along a travel path, taking into account the vehicle's characteristics such as vehicle size, maximum steering angle and maximum angle of steering in the opposite direction, during the parking procedure.

BACKGROUND OF THE INVENTION

From the state of the art, many approaches are known for supporting the driver when parking a vehicle.

DE 100 45 616 A1 describes a method for operating a display system. In this method, additional distance sensors are provided by means of which the parking space is measured. Based on this measured data, a control device assesses whether the parking space found is sufficiently large for parking the vehicle. If this is the case, a parking strategy by means of which the vehicle can be steered into the parking space is automatically calculated. This known method is associated with a disadvantage in that the system of distance sensors that are required for reliably measuring the size of the parking space is extremely expensive. Furthermore, this system leaves open a number of product liability issues, since, in the case of any errors made by the distance sensors during the measuring process, damage to other vehicles or the vehicle being parked can easily occur.

From DE 101 61 316 A1 a further parking-maneuver support system is known. In this system, the driver can select a correspondingly suitable mode depending on the given parking situation, with a pre-stored situation being displayed on the screen, depending on the respective mode selected. Depending on the subsequent vehicle movements, on the display screen, the position of the vehicle being parked changes relative to the pre-stored situation. However, the support system only functions in a satisfactory manner if the actual starting position of the vehicle agrees with the vehicle's starting position in the situation in the intermediate storage system. To ensure this, it is proposed that corresponding sensor systems for measuring the parking space be used. Alternatively, it is proposed by means of suitable position locating devices to enable the driver to bring the actual starting position into agreement with the starting position of the situation in the intermediate storage system. This system is associated with the disadvantage that it is not possible to reliably ensure truly adequate agreement between the actual starting position and the starting position of the situation in the intermediate storage system.

From DE 100 65 327 A1 a method is known in which the image data from a camera is displayed to the driver as an image on a display screen in the interior of the vehicle. A parking-space icon is faded into this image, which for example shows the real-time situation at the rear of the vehicle, wherein this parking-space icon in the real-time image in true scale indicates a region which the vehicle can be moved into from its actual starting position, taking into account the vehicle's characteristics, in particular vehicle size, maximum steering angle and maximum angle of steering in the opposite direction, during the parking procedure. In order to find a suitable parking place which is large enough for parking the vehicle, the driver then maneuvers the vehicle until the faded-in parking-space icon is essentially congruently superimposed on the parking space shown in the real-time image. As soon as this is the case, the vehicle is in a suitable starting position to drive into the parking space that is suitable for parking.

Starting from the proposal for finding a suitable parking space as disclosed in DE 100 65 327 A1, DE 102 50 021 proposes a method with which the found parking space can subsequently be driven into by the vehicle, with the aid of the display system in the vehicle. In the method described in DE 102 50 021, the defined starting point is the position of the vehicle in which the first parking-space icon has been made to overlay the parking space shown on the display screen. The image which is displayed at this starting point in time is put into the intermediate storage system and subsequently, during the following parking procedure is permanently displayed on the display screen. During the actual parking procedure, commencing with the starting position, a vehicle icon is faded into this fixed image, with the position of the vehicle icon being calculated, relative to the situation on screen, based on the movement data for the vehicle since the time the vehicle left the starting position. This provides the driver with the opportunity of controlling his/her own steering movements during the parking procedure, relative to the situation at the starting point. This method is associated with the disadvantage in that during the parking procedure no updated image of the external environment is displayed to the driver. Consequently, it can happen that the situation in the external environment changes without this being detectable on the screen of the display system during the parking procedure. Furthermore, this method still requires the driver to make the suitable steering movements during parking, without direct support being provided by the display system.

SUMMARY OF THE INVENTION

Starting from this state of the art it is thus the object of the present invention to provide a new method for operating a display system in a vehicle, by means of which system a parking space can be driven into.

The method according to the invention is based on the idea that a distinction of characteristic phases in the travel path can be made when driving into a parking space. In particular, longitudinal parking into a parking gap situated behind the vehicle and extending parallel to the longitudinal axis of the vehicle is characterized by two segments in the travel path when driving into the parking space. During the first segment of the travel path, the vehicle must be steered at a particular steering lock, i.e. a positive or negative steering angle, depending on whether parking is to take place on the left or right side of the street. At a particular point on the travel path, steering in the opposite direction takes place, with the vehicle entering the parking space at a particular angle of steering in the opposite direction, so that at the end of the second segment of the travel path, the vehicle is aligned parallel to the side border of the parking space. According to the invention, after the driver has reached the suitable starting position which she or he has easily found as a result of fade-in of the first parking-space icon, a second parking-space icon is faded in, which is associated with the end of the first segment of the travel path when driving into the parking space. Commencing in the start position, the driver has to continue moving the vehicle until the second parking space icon faded-in on the display screen is superimposed on the parking space shown in the real-time image, which the parking space is to be driven into according to plan. As soon as adequate overlay between the second parking-space icon and the parking space shown on the display screen has been achieved, the first segment of the travel path when driving into the parking space has been completed.

After the end of the first segment of the travel path to the parking space, a third parking-space icon is then faded into the real-time image on the display screen. This third parking-space icon is associated with the end of the second segment of the travel path to the parking space. That is to say, the driver now has to continue driving until the third parking-space icon has been made to overlay the parking space shown on the display screen.

In other words, in the method according to the invention, a plurality of parking-space icons (each associated with a corresponding one of a plurality of segments of the travel path to the parking space), preferably at least three different parking-space icons are stored in the image processing unit, which parking-space icons can be faded in sequence into the real-time image on the display screen. The first parking-space icon is used for finding a suitable parking space, especially one that is sufficiently long. By fading-in the first parking-space icon, the driver can easily drive to the starting position that is suitable for the parking procedure. The second parking-space icon is associated with the end of the first segment of the travel path to the parking space, so that the driver, by overlaying the second parking-space icon with the parking space shown on the display screen, can easily detect that the end of the first segment of the travel path to the parking space has been reached. The third parking-space icon is associated with the end of the second segment of the travel path to the parking space, so that the driver, by overlaying the third parking-space icon with the parking space shown on the display screen, can easily detect that the end of the second segment of the travel path to the parking space has been reached.

The method according to the invention for operating a display system is in particular suited to reverse longitudinal parking in parking spaces whose longitudinal axis extends parallel to the longitudinal axis of the vehicle, with said parking spaces being situated either to the left or to the right behind the vehicle. In order to facilitate the execution of such a reverse longitudinal parking procedure for the driver, it is particularly advantageous if the size and arrangement of the second parking-space icon are such that the first segment of the travel path to the parking space, or the second segment of the travel path to the parking space, is traveled through using constant steering lock (first segment of the travel path) or constant opposite steering lock (second segment of the travel path). This considerably simplifies the parking strategy for driving into the parking space, commencing from the starting position. In order to travel along the first segment of the travel path, the driver first sets the suitable steering angle, wherein it is particularly advantageous if this steering angle which is associated with the first segment of the travel path is displayed to the driver in some suitable manner. This constant steering angle has been calculated such that, commencing from the starting position, a position is directly reached in which the second parking-space icon can be made to overlap the parking space displayed on the display screen. As soon as this point has been reached, the driver sets a suitable opposite steering lock, wherein it is particularly advantageous if this opposite steering lock also appears on the display screen, and drives along the second segment of the travel path at this constant opposite steering lock. As a result of this, the driver can thus reliably drive into the parking space, commencing from the starting position, without having to consider a suitable parking strategy. Since, while moving along the two segments of the travel path to the parking space, the driver can also constantly monitor on the display screen the real-time situation in the region of the rear of the vehicle, she or he can check at any time whether the parking situation might have changed, for example by a pedestrian entering the space.

A particularly simple parking strategy results if traveling along the first segment of the travel path to the parking space and/or along the second segment of the travel path to the parking space is carried out using maximum steering lock and using maximum opposite steering lock respectively, of the vehicle. In other words, this means that the second parking-space icon or the third parking-space icon have to be faded into the real-time image at such a size or in such an arrangement that the vehicle, commencing from the starting position, can travel along the first segment of the travel path using maximum steering lock, and can travel along the second segment of the travel path using maximum opposite steering lock. In this procedure, it is easily possible, at the end of the first segment of the travel path, to make the second parking-space icon overlay the parking space faded-in on the display screen, and, at the end of the second segment of the travel path, to make the third parking-space icon overlay the parking space faded-in on the display screen.

Parking using maximum steering lock or maximum opposite steering lock requires a relatively large maneuvering space at the vehicle's front corner opposite the parking space. This is because in particular using maximum steering lock during the first segment of the travel path, this corner of the vehicle at the front swings out a considerable distance to the side. In confined spaces, for example in one-way streets, such wide swinging-out using maximum steering lock may not be possible. It is thus also imaginable that the driver is provided with a specific steering lock or opposite steering lock which is less than the maximum steering lock or maximum opposite steering lock, so that a smaller maneuvering space is required on the side at the front of the vehicle. The size and location of the second parking-space icon or third parking-space icon, which icon is to be faded-in on the display screen, are to be varied according to the specific steering lock, so that the driver, by bringing the second parking-space icon to overlap with the parking space displayed on screen can recognize the boundary between the first segment of the travel path (traveling at a constant specific steering lock) and the second segment of the travel path (traveling at a constant specific opposite steering lock).

If the first segment of the travel path to the parking space is traveled along at a steering lock which is less than the maximum steering lock, then the length of the travel path increases accordingly so that the available parking space has to be correspondingly larger (longer) in size.

In other words, this means that moving into a parking space of minimum longitudinal dimension requires parking using maximum steering locks.

It is therefore sensible to determine the specific steering lock for the first segment of the travel path depending on the size of the parking space available. In this way it is possible to determine the specific steering lock making possible an approach at less than maximum steering lock. According to a preferred variant of the method, to this effect, after the vehicle has reached the starting position, in which the first parking space icon has been brought to overlay the parking-space icon shown in the real-time image, with the vehicle at a standstill, the length of the parking-space icon is changed, depending on the steering lock at the steering wheel. This change in the length of the parking-space icon is in accordance with the relationship, known for every vehicle, between a specific steering lock selected to apply during the first segment of the travel path and the length of the resulting travel path when the parking space is approached. In this procedure, the steering lock is varied by the driver until the size of the changed parking-space icon essentially agrees with the size of the parking space shown in the real-time image. This steering lock is then used as the specific steering lock suitable for the subsequent parking procedure. In practical application, for the purpose of carrying out this variant of the method, the rear end of the parking space icon is moved rearward, depending on the actually set steering lock, until the rear end of the parking-space icon agrees with the object which limits the rear end of the parking space, for example another parked vehicle.

Basically, triggering fade-in of the second parking-space icon or the third parking-space icon can take place in any desired way. According to a first variant, a control element, in particular a button or push-in key can be provided in the vehicle. By activating this control element, the driver can then trigger fade-in of the respective parking-space icon, depending on the progress of the parking procedure.

As an alternative or in addition to this, it can be provided for the second parking-space icon or the third parking-space icon to be triggered by setting the maximum steering lock or maximum opposite steering lock. This obviates the need for specific activation by the driver for the purpose of fading-in the parking-space icons.

To make it possible for the driver to set the correct opposite steering lock at the point between the first segment and the second segment of the travel path to the parking space, based on the steering lock set, at the end of the first segment and before commencement of the second segment of the travel path, an icon for steering in the opposite direction can be faded-in on the display screen. Preferably, this icon for steering in the opposite direction is then automatically faded out again when the specified opposite lock has been set, thus indicating to the driver that the opposite steering lock necessary for traveling along the second segment of the travel path has been set.

Basically, the various parking-space icons can be faded-in on the display screen in any way desired. However, to ensure that the driver can monitor the situation to the rear of the vehicle at any time during the parking procedure by observing the display screen, it is particularly advantageous if the various parking-space icons are faded into the realtime image on the display screen so that they are at least somewhat transparent, in particular semi-transparent. As a result of this transparency of the parking-space icons, it is possible to monitor even those areas of the situation depicted on the display screen which are covered by the parking-space icons.

Basically, the design of the parking-space icons can be as desired. It is particularly advantageous if the parking-space icons indicate the size of the vehicle in a horizontal plane, because in this way the parking-space icons can be made to overlay the parking space shown on the display screen in a particularly easy way.

Furthermore, it is particularly advantageous if, together with the parking-space icons, marker pegs are faded-in on the display screen which in a vertical plane indicate to the driver the rear end of the region shown by the parking-space icons. This makes it easier for the driver to judge whether the rear end of the region displayed has already been pushed outward to such an extent that a collision with other objects, for example parked vehicles would occur.

As an alternative or in addition to the above, the parking-space icons can comprise distance marks which correspond to a particular distance from the rear of the vehicle. If, during the parking procedure, the driver brings these distance marks into a state of overlay with a particular object shown on the display screen, the exact distance between the rear of the vehicle and the respective object is shown as a result of this, which distance corresponds to the arrangement of the respective distance mark.

Preferably, the third parking-space icon is designed in the manner of a distance grid with distance marks and lateral boundary lines which indicate the extension of the vehicle sides.

Below, a variant of the method according to the invention is explained as an example, with reference to the drawings/diagrams. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
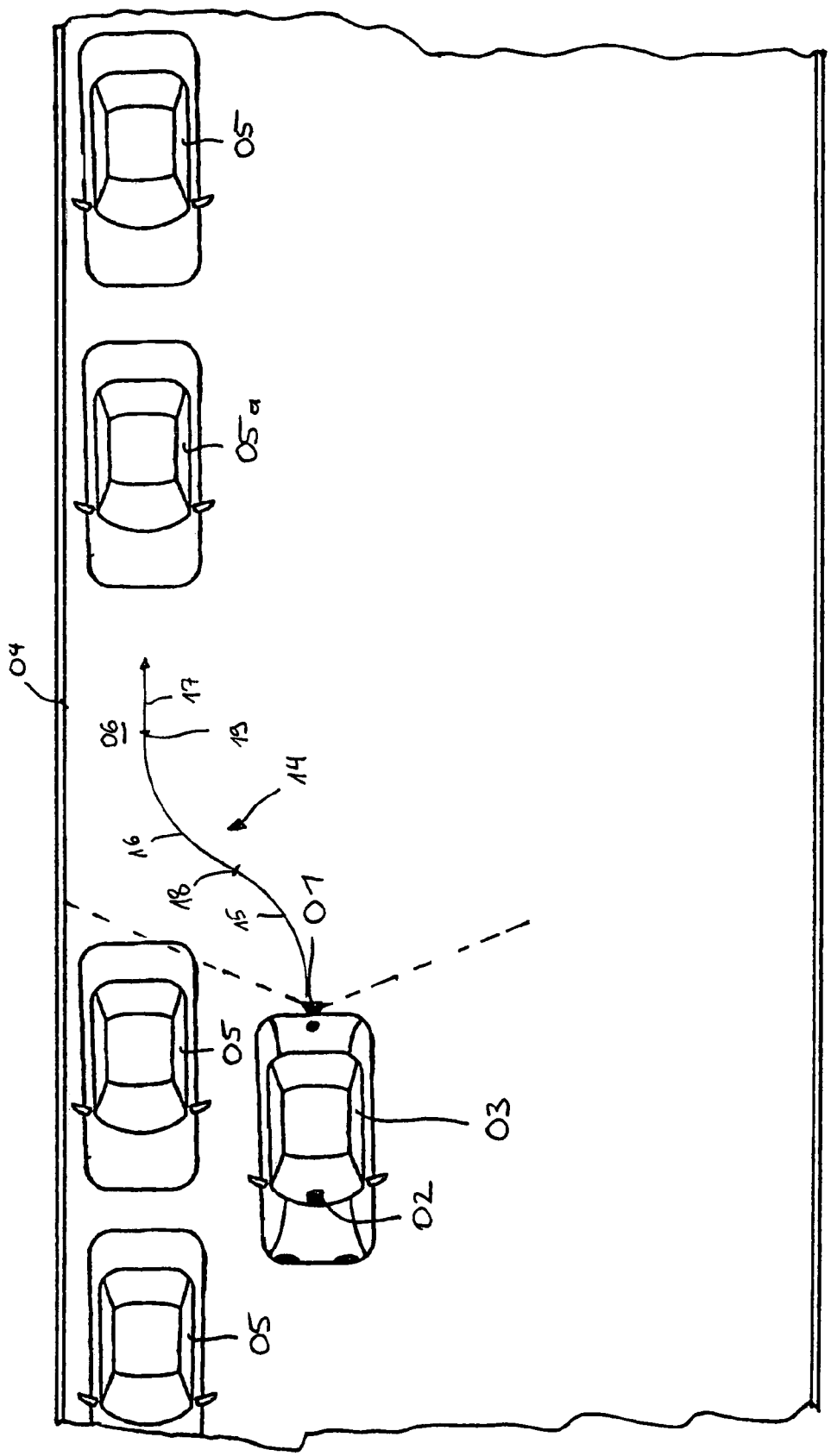
FIG. 1 is a top view of a vehicle in a parking situation during reverse longitudinal parking into a parking space which extends parallel to the roadside, on the passenger side.

Referring to the drawings in particular, FIG. 1 diagrammatically shows a top view of a typical parking situation. A vehicle 03, equipped with a suitable display system comprising a camera 01 and a display screen 02, drives past a row of vehicles 05 which are parked parallel to the curb 04, on the lookout for a parking space 06 in which said vehicle 03 can be left. The camera 01 takes images of the vicinity of the rear of the vehicle, which images are then displayed in real time on the display screen 02. By processing the image data in an image processing unit (not shown) in the vehicle 03, the image data taken by the camera 01 can be converted so that distortions caused by a wide-angle lens provided on the camera 01 can be eliminated. Furthermore, the image data can be converted such that the images taken by the camera 01 are shown on the display screen 02 so as to be mirror-inverted which makes it easier for the driver to assess the space situation in the region to the rear of the car. The examples of display screen images shown in FIG. 2 to FIG. 8 show image data which has not been mirror inverted.

FIG. 1 diagrammatically shows a travel path 14 along which the vehicle 03 can or must travel to approach the parking space 06. The travel path 14 comprises three segments 15, 16 and 17. In the first segment 15 the vehicle 03 travels using constant maximum steering lock until it reaches the point 18 of steering in the opposite direction. At the point of steering in the opposite direction the steering is turned to the opposite so that the second segment 16 of the travel path 14 is traveled through using constant opposite steering lock. As soon as the vehicle 03, at the end of the second segment 16, has reached a position in which its longitudinal axis is aligned parallel to the curb 04, at the point 19 of backsteering, backsteering takes place to the extent that the vehicle in the third segment 17 of the travel path 14 can reverse straight and thus parallel to the curb. With this, the parking procedure has been completed.

Figure 2:
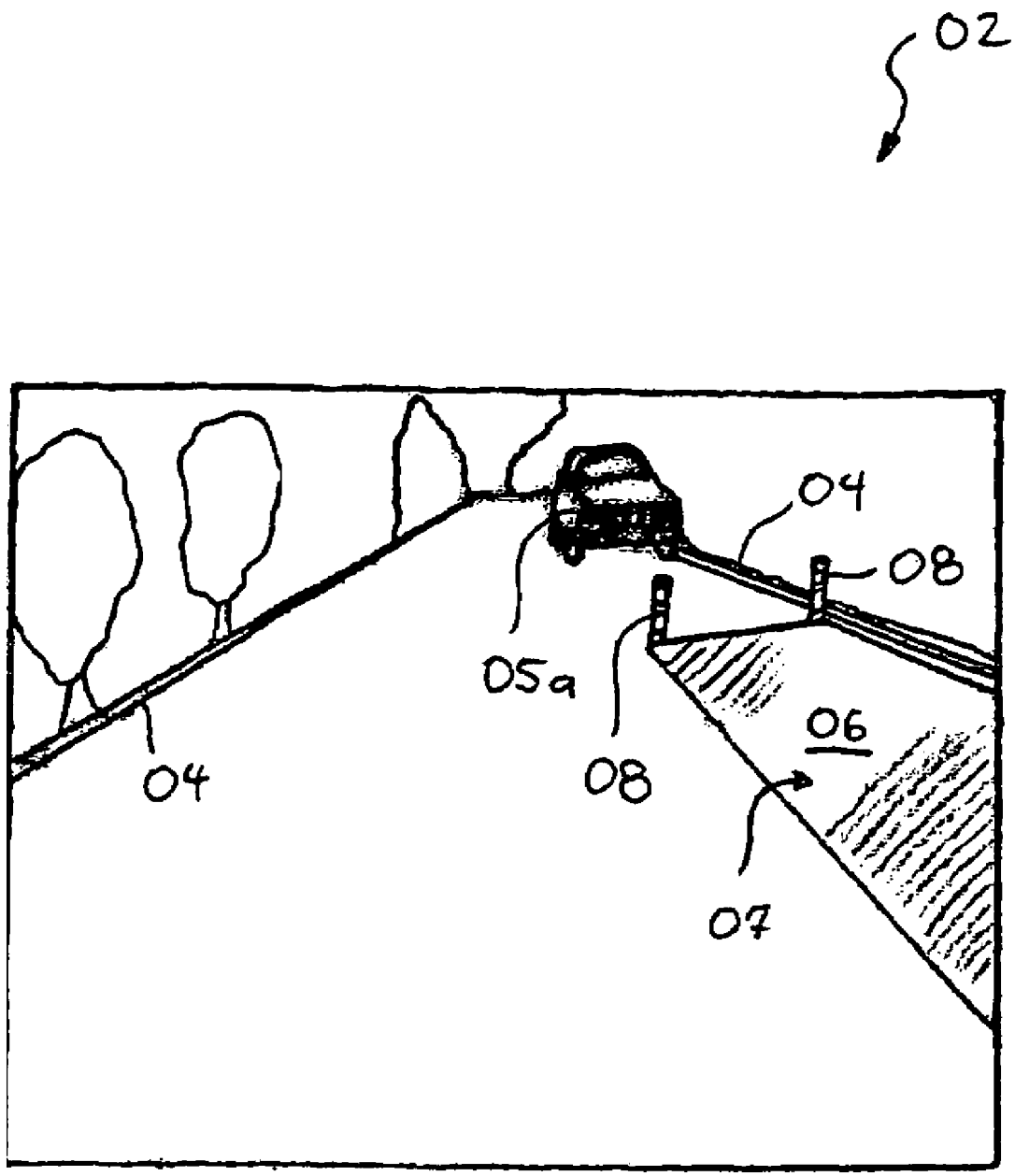
FIG. 2 is a view of the image displayed on a display screen in the vehicle, after the starting position has been reached at the beginning of the parking procedure.

FIG. 2 shows the image displayed on the screen 02 at the beginning of the parking procedure. This real-time image shows the rear vehicle 05a which delimits the parking space, the curb 04 and the parking space 06 which the vehicle 03 is to move into. In order to move the vehicle 03 into the correct starting position for commencement of the parking procedure, a first parking-space icon 07 is faded into the image on the display screen 02. The size and arrangement of the first parking-space icon 07 faded-in on the display screen 02 is stored in the image processing unit; it represents the dimensions of a region at the scale of the display screen 02, which region the vehicle can reach during reverse longitudinal parking into a parking gap situated on the passenger side. When a sufficiently large parking space 06 has been found, the driver of the vehicle 03 maneuvers until the first parking-space icon 07 has been brought to overlay the parking space 06 displayed on the display screen 02.

The size of the basic shape of the parking-space icon 07 is such that the region indicated by the parking-space icon 07 during reverse longitudinal parking is approached using maximum steering lock or opposite steering lock. In other words, this means that the basic shape of the parking-space icon 07 indicates the minimum size required of a parking space. As shown in FIG. 2, the actually available space in parking space 06 is larger than is necessary for parking the vehicle 03 using maximum steering lock. Consequently, during parking of the vehicle 03 in parking space 06, it is also possible to select a steering lock which is below the maximum steering lock.

Figure 3:
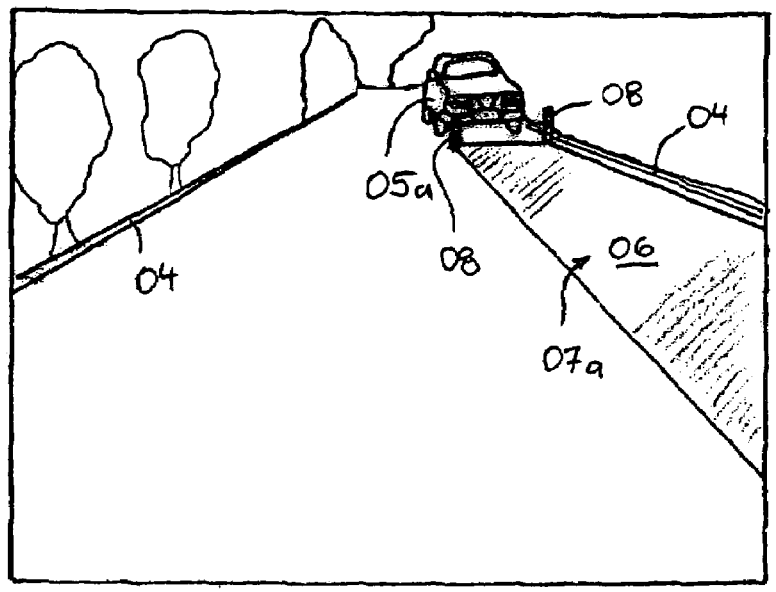
FIG. 3 is a view of the image, displayed on the display screen, for determining the specific steering angle for the first segment of the travel path.

FIG. 3 shows how to find the specific steering lock which is below the maximum steering lock for parking in parking space 06. To this effect after moving to the starting position according to FIG. 2, the vehicle 03 is stopped and starting from the maximum steering lock the actually set steering lock is continually reduced. This change in the steering lock is evaluated by the image display device, and the length of the parking-space icon 07 is changed depending on the actually set steering lock.

FIG. 3 shows this specific representation of the parking-space icon 07a at a setting of a specific steering lock which is below the maximum steering lock. As soon as the rear end of the parking-space icon 07a, which is additionally indicated by two side markers 08, agrees with the front end of the parking vehicle 05a, the driver of the vehicle 03 detects that in this way the specific steering lock is set with which, using the entire maneuvering space available in the parking space 06 and with minimum steering lock, the parking space 06 can be driven into. When the driver of the vehicle 03 has found this specific steering lock, she or he can initiate the next phase of the parking process by activating a respective control element, e.g. by releasing the brake.

Figure 4:
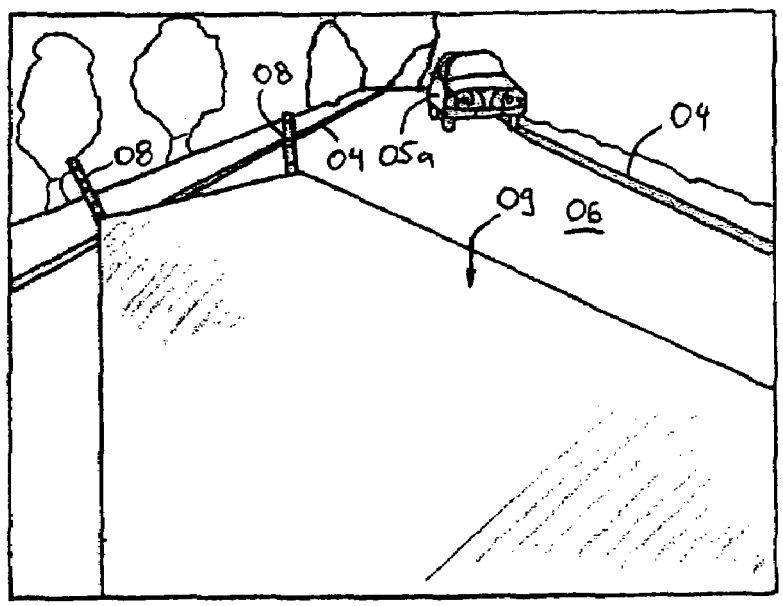
FIG. 4 is a view of the image, displayed on the display screen, with faded-in second parking-space icon, at the beginning of the first segment of the travel path.

As shown in FIG. 4, at the beginning of the next phase of the parking procedure, the first parking-space icon 07 or 07a is faded out on the display screen 02 and a second parking-space icon 09 is faded in. The size and arrangement of the second parking-space icon 09 are pre-stored in the image processing unit. The position and size of the display of the second parking-space icon 09 on the display screen 02 are not changed during the subsequent parking procedure. The size and arrangement of the second parking-space icon 09 is determined by the image processing unit such that when the specific steering lock found is adhered to, the first segment of the travel path 14 to the parking space 06 has to be traveled along at this constant specific steering lock.

Figure 5:
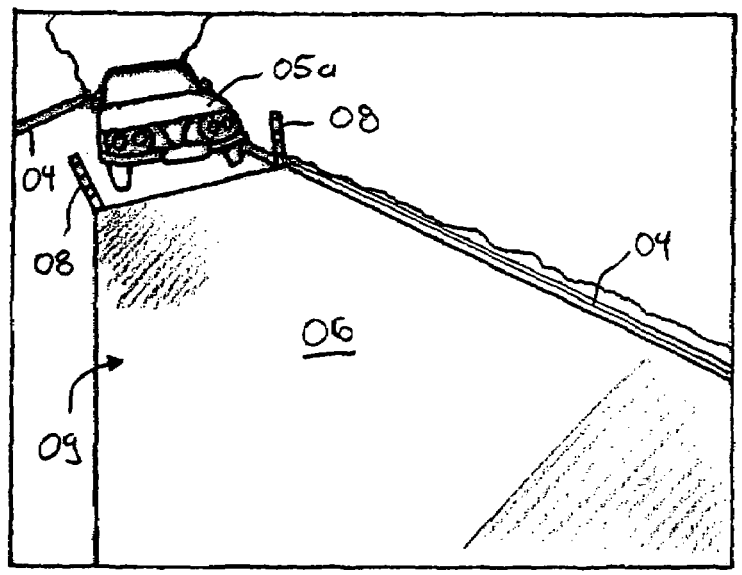
FIG. 5 is a view of the image, displayed on the display screen, with faded-in second parking-space icon, at the end of the first segment of the travel path.

The end of the first segment 15 of the travel path 14 to the parking space 06 is marked by the second parking-space icon 09 being brought to overlay the parking space 06. This situation is shown in FIG. 5.

As soon as the vehicle 03 has reached the end of the first segment 15 of the travel path 14 to the parking space 06, i.e. has reached the point 18 of steering in the opposite direction, the driver activates a respective control element, for example a button or push-in key. As an alternative to this manual activation, it is also possible to detect when this point along the way has been reached by querying suitable sensor information which necessarily arises at these path points when carrying out the parking procedure. In particular, information relating to the brake position or the steering position can be queried. The point of steering in the opposite direction is for example characterized in that the driver moves the steering to the middle position of the steering wheel and onward to the opposite direction.

Figure 6:
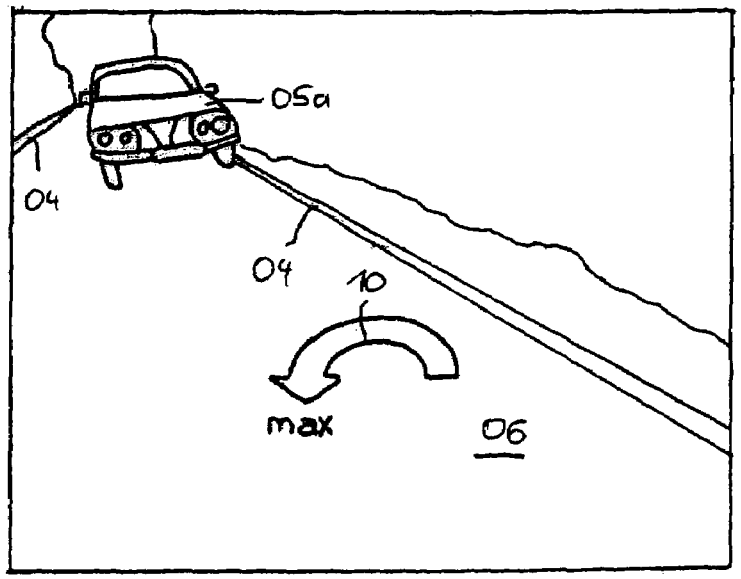
FIG. 6 is a view of the image, displayed on the display screen, with faded-in icon for steering in the opposite direction at the beginning of the second segment of the travel path.

As soon as this point along the path has been detected, an icon 10 for steering in the opposite direction is faded-in on the display screen 02, as shown in FIG. 6. Together with the icon 10 for steering in the opposite direction, the steering angle of the opposite steering lock for traveling along the second segment 16 of the travel path 14 to the parking space 06 can be faded-in for the driver to see. In the example shown, the driver is to set maximum steering lock.

Figure 7:
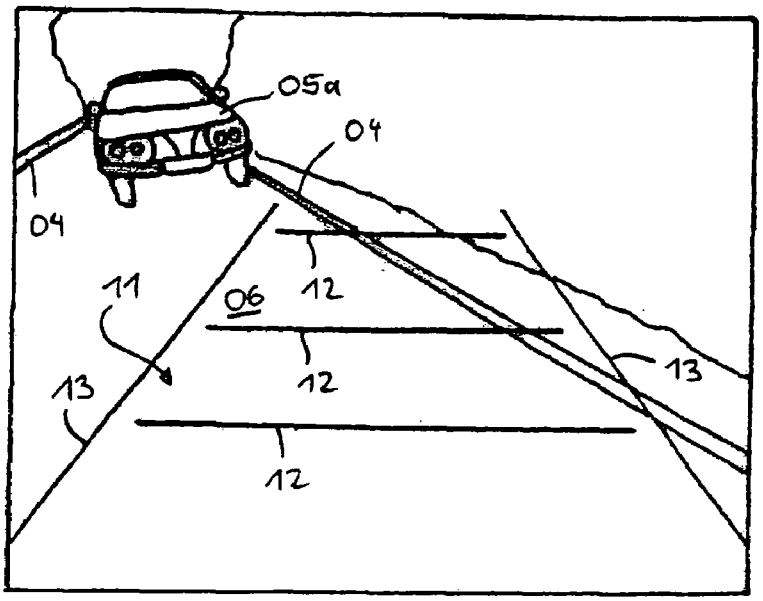
FIG. 7 is a view of the image, displayed on the display screen, with the faded-in third parking-space icon at the beginning of the second segment of the travel path.

As soon as the driver in vehicle 03 has reached maximum opposite steering lock on the steering wheel, as shown in FIG. 7, the icon 10 for steering in the opposite direction is faded out and a third parking-space icon 11 is faded into the image on the display screen 02. The third parking-space icon 11 is designed as a type of distance grid with distance marks 12 and lateral boundary lines 13. Each distance mark 12 signifies a certain distance from the rear end of the vehicle 03. The boundary lines 13 indicate the extension of the sides of the vehicle 03. When the driver has set the maximum opposite steering lock, she or he moves the vehicle 03 again and travels along the second segment 16 of the travel path 14 to the parking space 06.

Figure 8:
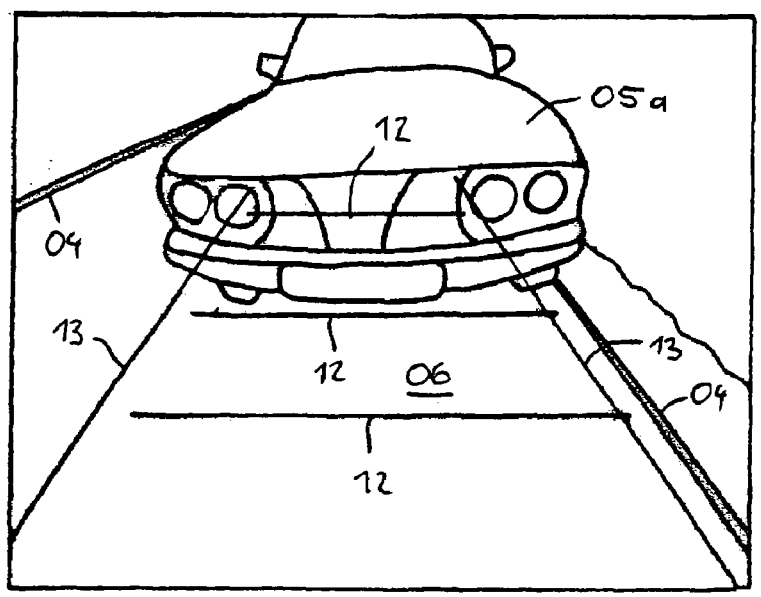
FIG. 8 is a view of the image, displayed on the display screen, with faded-in third parking-space icon, just before the end of the second segment of the travel path.

FIG. 8 shows the representation on the display screen 02 shortly before the end of the second segment 16 of the travel path 14 to the parking space 06 has been reached. The third parking-space icon 11 indicates the size of the vehicle 03 in a certain horizontal plane, for example 30 cm above the road surface. As shown in FIG. 8, the rearmost distance mark 12 has already reached the front grill of the vehicle 05a parked behind. From this, by consulting the display screen 02, the driver of the vehicle 03 can estimate the distance between the rear of her or his vehicle to the front of the vehicle 05a.

While specific embodiments of the invention have been shown and described in detail to illustrate the application of the principles of the invention, it will be understood that the invention may be embodied otherwise without departing from such principles.

What is claimed is:

1. A method for operating a display system in a vehicle when driving into a parking space, the method comprising:
   providing at least one camera with which an observation region in the vicinity of the vehicle can be acquired;
   providing an image processing unit in which the image data obtained by the camera can be processed;
   providing a display screen in the interior of the vehicle, on which display screen the image data obtained by the image processing unit can be displayed as an image;
   fading a first parking-space icon into the real-time image on the display screen using the image processing unit, with said first parking-space icon in the real-time image being in true scale and indicating a region which the vehicle can reach from its actual starting position after moving along a travel path, taking into account the vehicle's characteristics, in particular vehicle size, maximum steering angle and maximum angle of steering in the opposite direction, during the parking procedure;
   after the vehicle has moved to the vehicle position in which the first parking-space icon has been brought to overlay the parking space shown in the real-time image, fading a second parking space icon into the real-time image on the display screen using the image processing unit, with said second parking-space icon in the real-time image being in true scale and indicating a region which after moving along a first segment of the travel path towards the parking space must be brought to overlay the parking space shown in the real-time image; and
   after the vehicle has moved to the vehicle position in which the second parking-space icon has been brought to overlay the parking space shown in the real-time image, fading a third parking space icon into the real-time image on the display screen using the image processing unit, with said third parking space icon in the real-time image in true scale indicating a region which after moving along a second segment of the travel path towards the parking space must be brought to overlay the parking space shown in the real-time image.

2. The method according to claim 1, wherein the size and arrangement of the second parking-space icon are such that the first segment of the travel path to the parking space can be traveled through using constant steering lock.

3. The method according to claim 2, wherein the first segment of the travel path to the parking space is traveled through using maximum steering lock.

4. The method according to claim 2, wherein the first segment of the travel path to the parking space is traveled through using a specific steering lock which is determined depending on the size of the available parking space.

5. The method according to claim 4, wherein the specific steering lock for the first segment of the travel path is determined such that after the vehicle has reached the starting position, in which the first parking-space icon has been brought to overlay the parking space shown in the realtime image, with the vehicle at a standstill, the length of the first parking-space icon is changed depending on the steering lock at the steering wheel, wherein the steering lock is used as a specific steering lock in which the size of the first parking-space icon essentially agrees with the size of the parking space displayed in the real-time image.

6. The method according to claim 2, wherein the constant steering lock associated with the first segment of the travel path to the parking space is communicated to the driver optically, acoustically, in a tactile way or in some other way.

7. The method according to claim 1, wherein the fade-in of the second parking-space icon is initiated by activating one of a control element, a button, a push-in key, a knob and a touch element in the interior of the vehicle.

8. The method according to claim 1, wherein fade-in of the second parking-space icon is initiated by querying a particular sensor, in particular by querying the setting of the maximum steering lock on the steering wheel.

9. The method according to claim 1, wherein the size and arrangement of the third parking-space icon are such that the second segment of the travel path to the parking space can be traveled through using constant opposite steering lock.

10. The method according to claim 9, wherein the second segment of the travel path to the parking space is traveled through using maximum opposite steering lock of the vehicle's steering.

11. The method according to claim 9, wherein the second segment of the travel path to the parking space is traveled through using a specific opposite steering lock which is determined depending on the length of the available parking space.

12. The method according to claim 1, wherein the constant steering lock associated with the second segment of the travel path to the parking space is communicated to the driver optically, acoustically, in a tactile way or in some other way.

13. The method according to claim 1, wherein the fade-in of the third parking-space icon is initiated by activating a control element, a button, a push-in key, a knob and a touch element in the interior of the vehicle.

14. The method according to claim 1, wherein the fade-in of the third parking-space icon is initiated by querying a particular sensor, in particular by querying the setting of the maximum opposite steering lock on the steering wheel.

15. The method according to claim 11, wherein during steering in the opposite direction for setting the opposite steering lock, an icon for steering in the opposite direction is faded-in on the display screen.

16. The method according to claim 15, wherein when a specified opposite steering lock, in particular the maximum opposite steering lock, has been reached the icon for steering in the opposite direction is automatically faded out and/or if a specified steering lock has not been adhered to, the icon for steering in the opposite direction is automatically faded-in.

17. The method according to claims 1, wherein the first parking-space icon and/or the second parking-space icon and/or the third parking-space icon are faded into the real-time image on the display screen in such a way that the parking-space icons are at least somewhat transparent or semi-transparent.

18. The method according to claim 1, wherein the first parking-space icon and/or the second parking-space icon and/or the third parking-space icon are in the shape of a polygon with an open or closed contour, with said polygon indicating the size of the vehicle in a particular horizontal plane.

19. The method according to claim 1, wherein the first parking-space icon and/or the second parking-space icon and/or the third parking-space icon comprise marker pegs which indicate the rear end of the region indicated by the parking-space icon in a vertical plane.

20. The method according to claim 1, wherein the first parking-space icon and/or the second parking-space icon and/or the third parking-space icon comprise at least one distance mark which indicates a certain distance from the rear of the vehicle in a certain horizontal plane.

21. The method according to claim 1, wherein the third parking-space icon is designed in the manner of a distance grid with distance marks and lateral boundary lines which indicate the extension of the sides of the vehicle.

22. The method according to claim 1, wherein the image data obtained via the camera is processed in the image processing unit such that the images displayed on the display screen are mirror-inverted.

* * * * *